(12) United States Patent
Smith et al.

(10) Patent No.: US 10,713,615 B2
(45) Date of Patent: Jul. 14, 2020

(54) SYSTEM AND METHOD FOR REBALANCING INTER-STORE RETAIL INVENTORIES UTILIZING OVERSTOCK INVENTORY

(71) Applicant: Oracle International Corporation, Redwood Shores, CA (US)

(72) Inventors: Lisa Marie Smith, Woodbury, MN (US); Michael R. Johnson, Excelsior, MN (US)

(73) Assignee: Oracle International Corporation, Redwood Shores, CA (US)

( * ) Notice: Subject to any disclaimer, the term of this patent is extended or adjusted under 35 U.S.C. 154(b) by 195 days.

(21) Appl. No.: 15/419,302

(22) Filed: Jan. 30, 2017

(65) Prior Publication Data
US 2018/0218312 A1    Aug. 2, 2018

(51) Int. Cl.
*G06Q 10/08* (2012.01)
*G06Q 30/06* (2012.01)
*G06Q 10/06* (2012.01)

(52) U.S. Cl.
CPC ..... *G06Q 10/087* (2013.01); *G06Q 10/06315* (2013.01); *G06Q 30/0633* (2013.01)

(58) Field of Classification Search
CPC .... G06Q 10/087; G06Q 10/08; G06Q 20/203; G06Q 30/0639; B65G 1/1373
See application file for complete search history.

(56) References Cited

U.S. PATENT DOCUMENTS

| | | | |
|---|---|---|---|
| 6,609,101 B1 * | 8/2003 | Landvater | G06Q 10/06 705/7.25 |
| 7,900,153 B2 * | 3/2011 | Damodaran | G06F 17/30241 715/200 |
| 2003/0222141 A1 * | 12/2003 | Vogler | G06Q 10/08 235/385 |
| 2003/0233271 A1 * | 12/2003 | Bamberg | G06Q 10/06 705/7.33 |

(Continued)

OTHER PUBLICATIONS

XpertMart.com—Automatic Transfers Between Balance Inventory Between Stores Aug. 10, 2002, Retrieved from Archive.org Oct. 1, 2018 (Year: 2002).*

(Continued)

*Primary Examiner* — Scott L Jarrett
(74) *Attorney, Agent, or Firm* — Potomac Law Group, PLLC (57) ABSTRACT

Systems and methods that mitigate inventory overstock of a retail product are provided. The systems and methods receive inventory information for the retail product and determine, according to the inventory information for the retail product, whether a number of stock cover days is greater than a stock cover days threshold. It is also determined, according to the inventory information for the retail product, whether a projected inventory is greater than an overstock units threshold. When the number of stock cover days is greater than the stock cover days threshold, and when the projected inventory is greater than the overstock units threshold, it is determined whether another store location is ordering the retail product, and when another store location is ordering, an overstock rebalancing alert is provided to a user.

20 Claims, 9 Drawing Sheets

(56) References Cited

U.S. PATENT DOCUMENTS

| | | | | |
|---|---|---|---|---|
| 2006/0085235 | A1* | 4/2006 | Nguyen | G06Q 10/087 705/28 |
| 2007/0162356 | A1* | 7/2007 | Nguyen | G06Q 10/087 705/28 |
| 2007/0282694 | A1* | 12/2007 | Gould | G06Q 10/087 705/14.39 |
| 2012/0054076 | A1* | 3/2012 | Wu | G06Q 10/087 705/28 |
| 2012/0303492 | A1* | 11/2012 | Connors | G06Q 10/0833 705/28 |
| 2014/0257912 | A1* | 9/2014 | Hsieh | G06Q 10/06315 705/7.25 |
| 2015/0095091 | A1* | 4/2015 | Kamdar | G06Q 10/06315 705/7.25 |
| 2016/0092829 | A1* | 3/2016 | Jones | G06Q 10/087 705/28 |
| 2016/0125333 | A1* | 5/2016 | Cheng | G06Q 10/06312 705/7.22 |
| 2017/0140406 | A1* | 5/2017 | Anderson | G06Q 10/087 |
| 2017/0286899 | A1* | 10/2017 | Deshpande | G06Q 10/087 |
| 2018/0005171 | A1* | 1/2018 | Harsha | G06Q 10/087 |

OTHER PUBLICATIONS

Artley, Melissa, Oracle Retail Advanced Inventory Planning Store and Warehouse Replenishment Planning User Guide for RPAS Fusion Client, Release 13.2.2, Oracle, 2011 (Year: 2011).*

Carlile, Kristy et al., Oracle Fusion Applications Materials Management and Logistics, Inventory Guide Oracle, 2011-2012 (Year: 2011).*

Artley, Melissa, Oracle Retail Advanced Inventory Planning Store and Warehouse Replenishment Planning User Guide for RPAS Fusion Client, Release 14.1, Oracle, 2014 (Year: 2014).*

Martin, Andre et al., Flowcasting the Retail Supply Chain Factory 2 Shelf Publishing, 2006 (Year: 2006).*

Oracle Data Sheet, "Oracle Retail Advanced Inventory Planning", http://www.oracle.com/us/products/applications/047071.pdf, last downloaded Jan. 30, 2017.

* cited by examiner

| | | SKU o30, Orange Widgets at Store S901 | | | | | |
|---|---|---|---|---|---|---|---|
| Day | | 0 | 1 | 2 | 3 | 4 | 5 |
| PI | | 100 | 150 | 100 | 150 | 110 | 60 |
| FD | | 60 | 40 | 40 | 60 | 50 | 120 |
| BO | 0 | | | | | | |
| PSCD | | 2.00 | 3.20 | 2.00 | 2.33 | 1.50 | 0.5 |

| | | | 20-Jul-16 | | | | | 21-Jul-16 | | | | |
|---|---|---|---|---|---|---|---|---|---|---|---|---|
| | 530 | 531 URP | 532 Stock Cover Days | 533 Qty to Distribute | pack size to distribute 534 | 535 Target Stock | 536 Total Manual Receipt | URP | Stock Cover Days | Qty to Distribute | pack size to distribute | Target Stock | Total Manual Receipt |
| 01 - East Metro | | | | | | | | | | | | |
| S10 - Woodbury | | 12 | 2.8 | | | 12 | | | | | | |
| S12 - Cottage Grove | | 39 | 4 | | | 24 | | | | | | |
| S13 - St. Paul | | 24 | 4.1 | | | 24 | | | | | | |
| S18 - Roseville | | 12 | 3.2 | | | 12 | | | | | | |
| S19 - Hudson | | 6 | 3 | | | 6 | | | | | | |
| S20 - Stillwater | | | 7 | 48 | 1 | | | | | | | |
| 02 - South Metro | | | | | | | | | | | | |
| S21 - Hastings | | | 3 | | | 12 | | 12 | | | | |
| S22 - Apple Valley | | | 4 | | | 6 | | 6 | | | | |
| S23 - Lakeville | 520 | | 9 | | | 6 | | 6 | | | | |
| S24 - Bloomington | | | 5 | | | 12 | | 12 | | | | |
| S25 - Farmington | | | 3.3 | | | | | | | | | |
| 03 - West Metro | | | | | | | | | | | | |
| S26 - Rogers | | | | | | 36 | | | | | | |
| S27 - Elk River | | | | | | 36 | | | | | | |
| S28 - Minnetonka | | | | | | 24 | | | | | | |
| S29 - Excelsior | | | | | | 30 | | | | | | |
| S30 - Chanhassen | | | | | | 38 | | | | | | |
| 04 - South West Metro | | | | | | | | | | | | |
| S31 - Savage | | | | | | 12 | | | | | | |
| S32 - Orono | | | | | | 6 | | | | | | |
| S33 - Eden Prarie | | | | | | 6 | | | | | | |
| W100 - Bloomington | | | | | | | | | | | | |

SYSTEM AND METHOD FOR REBALANCING INTER-STORE RETAIL INVENTORIES UTILIZING OVERSTOCK INVENTORY

FIELD

The embodiments of the present invention generally relate to supply chain management and, more particularly, to the supply chain management functions for inventory rebalancing.

BACKGROUND

Today, many retail stores are under increasing pressure to maximize profits and to minimize waste. To this end, retail stores continually monitor inventory, and undertake several measures (e.g., promotions or discounts) to ensure that desired products are continually available while maintaining a desired turnover rate (i.e., items not staying on store shelves for an excessive period of time).

At times, however, inventory of particular items at some retail stores of a retailer with multiple stores can become overstocked due to poor purchasing decisions (e.g., trend alignment), unseasonable weather, poor performing promotions, and the like. Meanwhile, counterpart locations of the retailer may be selling inventory of the same items and may further be in need of additional inventory.

SUMMARY

The embodiments of the present invention are generally directed toward systems and methods that enable supply chain management functions for inventory rebalancing between retail store locations and warehouse locations that represent other retail store locations that substantially improve upon the related art.

Features and advantages of the embodiments are set forth in the description which follows, or will be apparent from the description, or may be learned by practice of the invention.

For example, the embodiments are generally directed to systems and methods that mitigate inventory overstock of a retail product that receive inventory information for the retail product and determine, according to the inventory information for the retail product, whether a number of stock cover days is greater than a stock cover days threshold. It is also determined, according to the inventory information for the retail product, whether a projected inventory is greater than an overstock units threshold. When the number of stock cover days is greater than the stock cover days threshold, and when the projected inventory is greater than the overstock units threshold, it is determined whether another store location is ordering the retail product, and when another store location is ordering, an overstock rebalancing alert is provided to a user.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

The embodiments of the present invention are generally directed to systems and methods that enable supply chain management functions for inventory rebalancing between retail store locations and/or warehouses. In the various embodiments, the inventory rebalancing modules described herein are configured to alert a user to an actual or projected inventory overstock. For example, in response to the potential overstock, the inventory may be rebalanced between store locations and warehouses in order to significantly reduce additional purchasing in the supply chain. In addition, and as a result, discounts or markdowns of excess inventory may be avoided. The user can review metrics and select inventory target levels against which the system generates a recommended inventory rebalance plan.

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse.

The electronic device may support a variety of applications, such as Internet browser, text messenger, inventory management, and various other applications. The various applications that may be executed on the electronic device may use at least one common physical user-interface device. In addition, a common physical architecture of the electronic device may support a variety of applications with user interfaces that are intuitive and transparent. In the discussion that follows, the inventory rebalancing modules are used as an example embodiment, but it should be understood that the user interfaces and associated methods of the inventory rebalancing modules may be readily applied to other applications.

Figure 1:
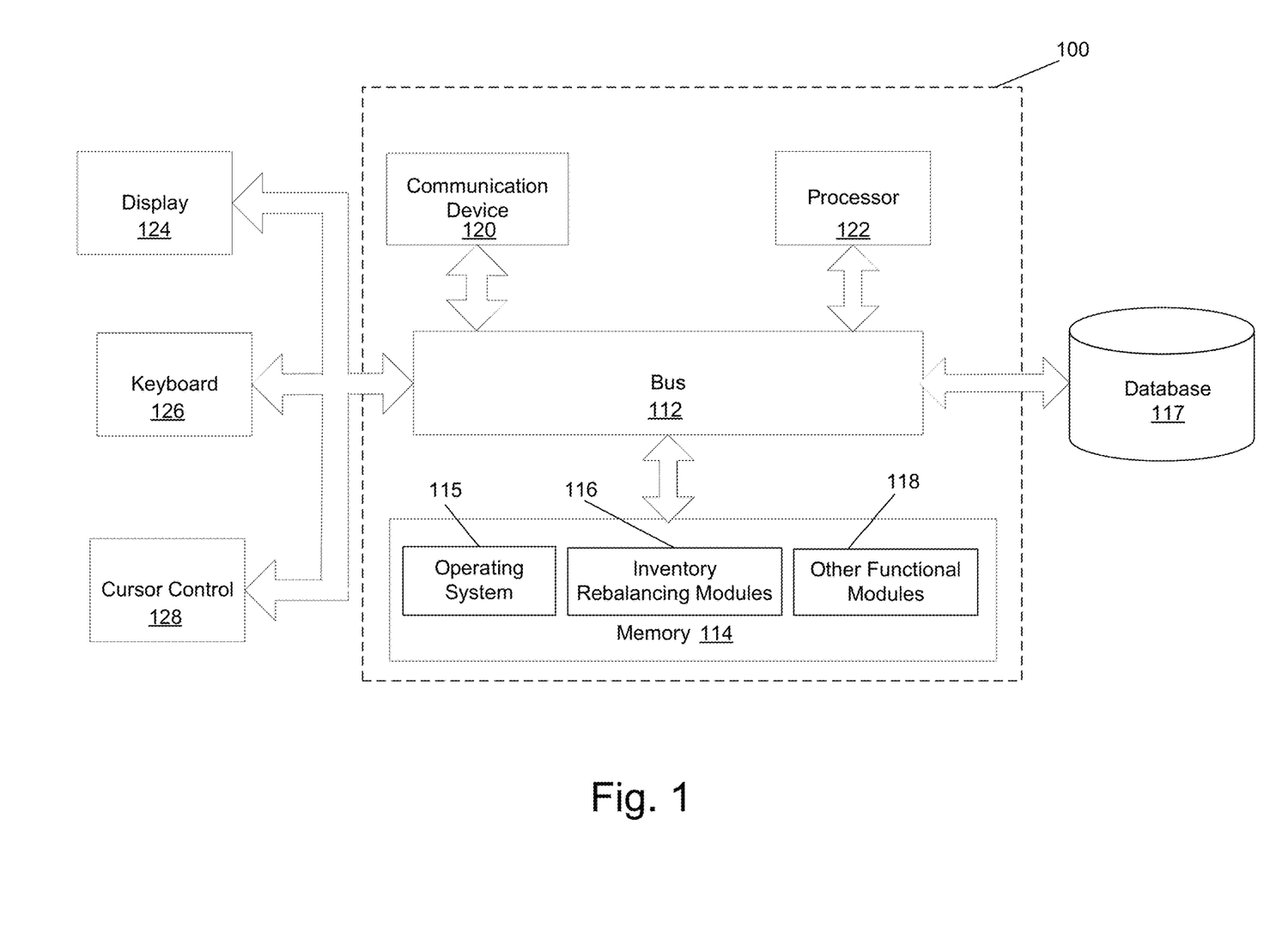
FIG. 1 is a block diagram of a computer server/system in accordance with an example embodiment of the present invention.

FIG. 1 is a block diagram of a computer server/system 100 in accordance with an example embodiment of the present invention.

As shown in FIG. 1, system 100 may include a bus 112 and/or other communication mechanism(s) configured to communicate information between the various components of system 100, such as a processor 122 and a memory 114. In addition, a communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may comprise one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122.

System 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 100. The modules can further include inventory rebalancing modules 116 configured to alert the user to an actual or projected inventory overstock so that inventory may be rebalanced between retail store locations, as well as other functional modules 118.

In some instances, inventory rebalancing modules 116 may illustrate the movement of goods from store-to-store or store-to-warehouse on both the sending and receiving side, according to one or more rules. Inventory rebalancing modules 116 may include one or more application program interfaces ("API") that enable users to monitor inventory levels, as will be described in more detail below.

Memory 114 may include a variety of computer-readable media that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory or transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with transaction system 100.

System 100 can be part of a larger system. Therefore, system 100 can include one or more additional functional modules 118 to include the additional functionality, such as other applications. Other functional modules 118 may include the various modules of the Retailer Predictive Application Server ("RPAS") provided by Oracle Corp., for example. The RPAS platform, in conjunction with inventory rebalancing modules 116, enables the user to quickly perform aggregations of the chosen inventory target fill levels to determine or otherwise analyze a total inventory quantity to rebalance. Alternatively, the user may use the solution-provided calculations to immediately recommend exactly how much inventory to send to other store locations. In another example, other functional modules 118 may include the various modules of Retail Advanced Inventory Planning ("AIP") by Oracle Corp. In conjunction with AIP, inventory rebalancing modules 116 may execute precision based calculations to project future inventory levels and future inventory needs and to provide highly accurate inventory and need projections that identify and alert the user to inventory re-balance opportunities. In yet another example, functional modules 118 may include components of other commercially available retail merchandising services ("RMS") systems.

A database 117 is coupled to bus 112 to provide centralized storage for modules 116 and 118 and to store inventory levels, projected inventory levels, actual sales, projected sales, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art. In an example configuration, the AIP modules may utilize the RPAS platform, which includes a multi-dimensional database.

Using the embodiments of the present invention, the retailer may avoid unnecessary inventory stocking costs by rebalancing inventory between the various retail store locations on a demand-driven basis. At present, known solutions manually analyze a store's current inventory level compared to a projected rate of sale and high cost of moving the inventory. Subsequently, the current inventory and the projected rate of sale at nearby retail store locations are also reviewed to determine whether to recommend the rebalancing of inventory between retail store locations. However, known solutions do not further account for projected inventory replenishment, and further do not alert the user to recommended inventory rebalances.

Although illustrated as a single system, the functionality of system 100 may be implemented as a distributed system. Further, the functionality disclosed herein may be implemented on separate servers or devices that may be coupled together over a network. Further, one or more components of system 100 may not be included. For example, for functionality of a user client, system 100 may be a smartphone that includes a processor, memory and a display, but may not include one or more of the other components shown in FIG. 1.

Figure 2:
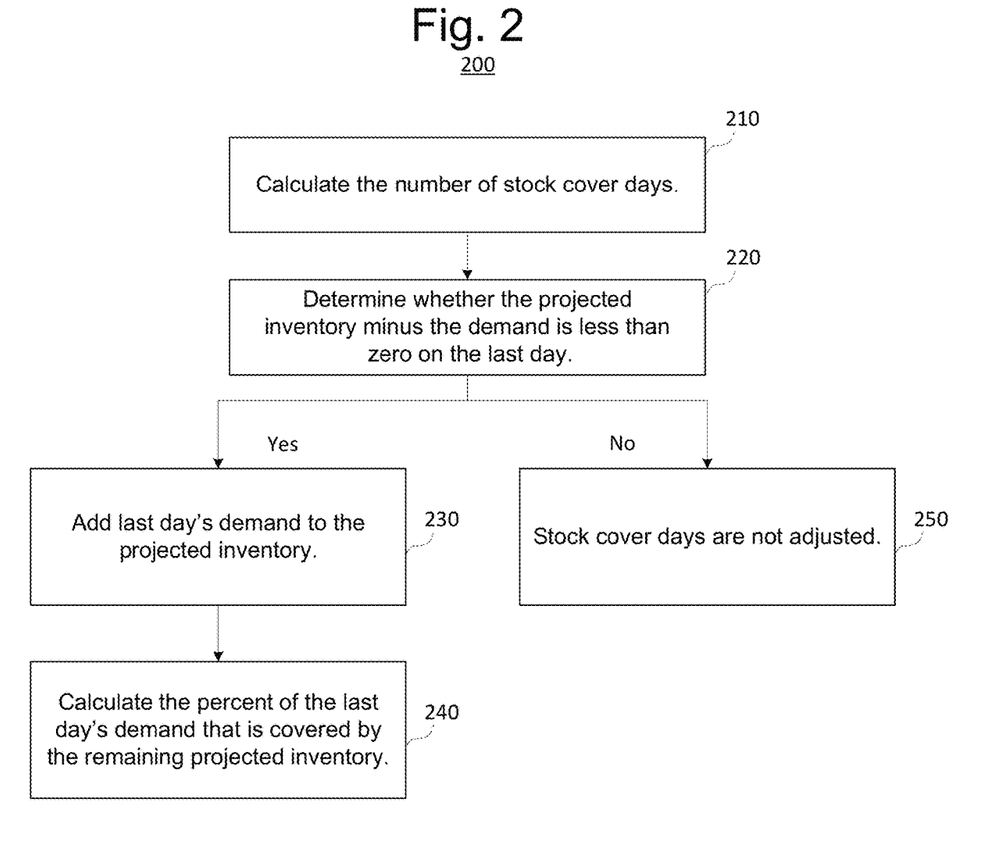
FIG. 2 illustrates a flow diagram for determining whether the projected inventory is sufficient for an overstock horizon period according to an example embodiment of the present invention.

FIG. 2 illustrates a flow diagram 200 for determining whether the projected inventory is sufficient for an overstock horizon period according to an example embodiment of the present invention. In one embodiment, the functionality of the flow diagram 200 of FIG. 2 (and flow diagram 400 of FIG. 4 described below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

In the discussion which follows, "stock cover" or "stock cover days" represent the number of days, current and future, for which projected inventory for a particular stock keeping unit ("SKU") on a given day and at a particular store will satisfy projected demand. Stock cover days are calculated for days within an "overstock horizon period" though the calculation also may look toward days beyond the overstock horizon period to determine stock cover days for days within the overstock horizon period.

At the outset, flow diagram 200 calculates the number of stock cover days. The number of stock cover days includes the number of days "x" from the current day "t" until the expected demand exceeds the projected inventory, at 210. For example, the number of stock cover days may be calculated using the following example equation (1) which subtracts a variety of demand variables from the projected inventory:

$$PI_t - BO - TSQ_x - (DMD_x + CO_x + DAPI_x + DARcpt_x) \quad (1)$$

where "PI" denotes projected inventory, "TSQ" denotes total substitute quantity, "DMD" denotes demand, "CO" denotes customer orders, "DAPI" denotes demand adjustments to projected inventory, and "DARcpt" denotes demand adjustments to receipts. In this example equation, back orders BO may be subtracted once from the current day's projected inventory before subtracting daily demand. In the event that demand is zero on any particular day, that day will still increment the number of stock cover days.

At 220, flow diagram 200 determines whether the projected inventory minus the various demand variables is less than zero on the last day x. If the projected inventory minus the demand is less than zero on the last day, then the inventory is only provided for a portion of the last day. Accordingly, the last day may be subtracted from the number of stock cover days using the following decrementing equation: SCDCount=SCDCount-1, where SCDCount=Stock Cover Days Count. In addition, although not shown, the stock cover for a portion of the last day may also be calculated by flow diagram 200.

Next, at 230, flow diagram 200 adds the last day's demand to the initial projected inventory to determine the remaining projected inventory quantity at the start of the last day (now decremented at 220). In other words, this is the remaining projected inventory before demand was subtracted off which caused a negative remaining projected inventory.

Subsequently, at 240, flow diagram 200 calculates the percent of the last day's demand that is covered by the remaining projected inventory quantity available for that day. For example, the percent of last days demand may be given by the following example equation (2):

$$PerLDD = PI_{Remaining}(x)/DMD(x) \quad (2)$$

where "PerLDD" denotes percent of last days demand, "$PI_{Remaining}$" denotes remaining projected inventory, and "DMD" denotes demand. Again, t is the current day, and x is the last day that projected inventory covers demand. In some instances, stock cover days may include stock cover days plus the percent of the last day's demand. In this example, SCDays=SCDCount+PerLDD, where "SCDays" denotes stock cover days, "SCDCount" denotes stock cover says count, and "PerLDD" denotes percent of last days demand.

Returning to 220, if flow diagram 200 alternatively determines that the remaining projected inventory minus demand is greater than zero on the last day of the overstock horizon period, the stock cover days will remain equal to the number of days between the current day and the end of the overstock horizon period, at 250.

Figure 3:
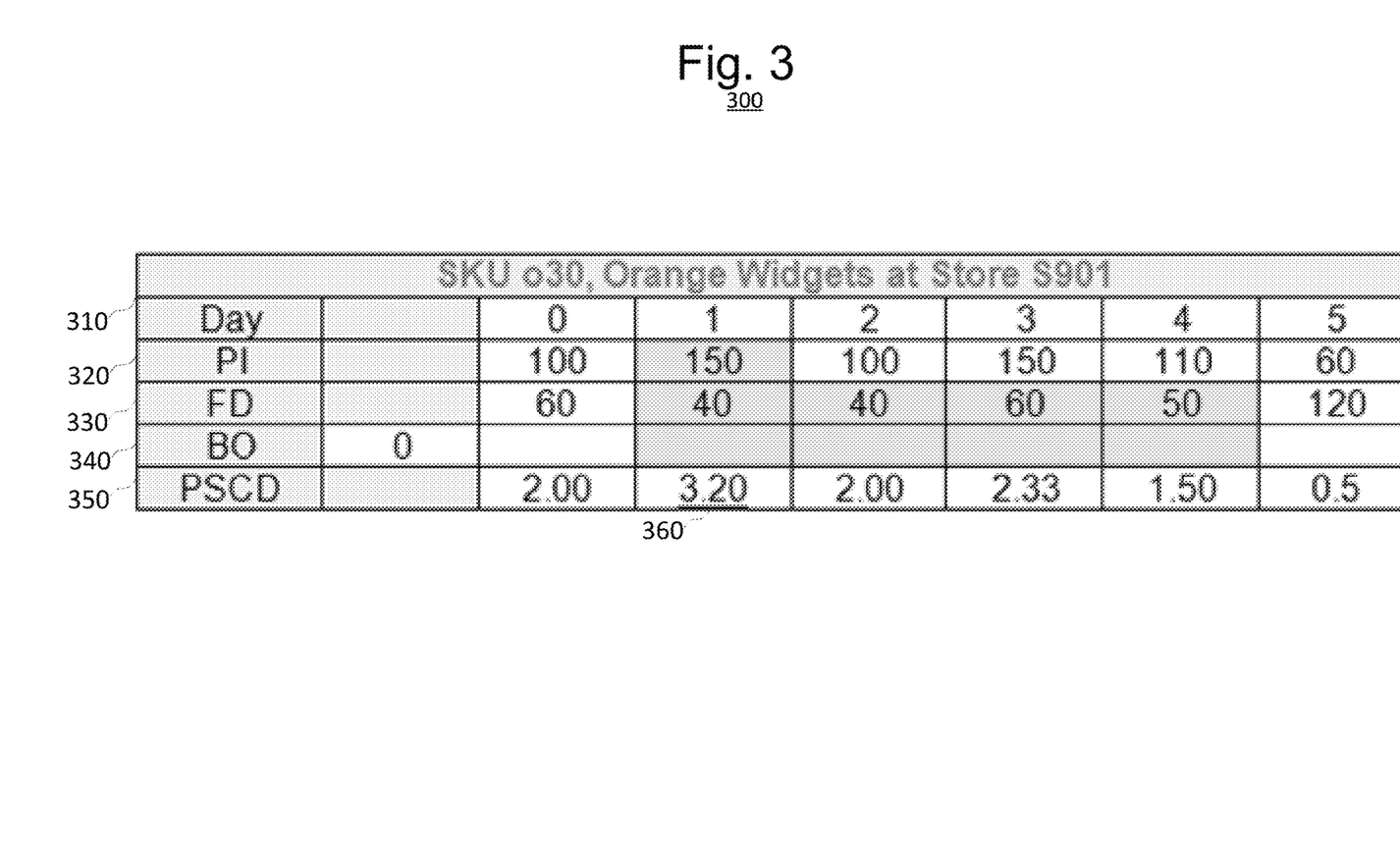
FIG. 3 is a graphical illustration for the calculation of stock cover days according to an example embodiment of the present invention.

FIG. 3 is a graphical illustration 300 for the calculation of stock cover days according to an example embodiment of the present invention. As shown in FIG. 3, illustration 300 includes rows for number of days 310, projected inventory 320, forecast demand 330, back orders 340, and projected stock cover days 350.

In connection with the example illustration 300 of FIG. 3, the calculation of projected stock cover days ("PSCD") on day one will now be discussed. On day one, there is a projected inventory of 150 units of SKU "o30" or orange widgets at store number "S901". In order to calculate how many stock cover days may be covered by 150 units of SKU o30, the inventory rebalancing modules (e.g., inventory rebalancing modules 116 of FIG. 1) calculate how many days of demand can be subtracted from 150 units until the projected inventory is less than or equal to zero. For example, the projected inventory minus the forecasted demand on day one renders 150−40 which equals 110 units. In other words, PI(t)−FD(t)=150−40=110 units, when t=1. As the projected inventory remains positive, at least one stock cover day is available.

The forecasted demand for an additional day is subsequently calculated. For example, the projected inventory minus the forecasted demand for two days renders 150−(40+40) which equals 70 units. In other words, PI(t)−(FD(t)+FD(t+1))=150−(40+40)=70 units. As the projected inventory remains positive, at least two stock cover days are available. The forecasted demand for yet an additional day is subsequently calculated. For example, the projected inventory minus forecasted demand for three days renders 150−(40+40+60) which equals 10 units. In other words, PI(t)−(FD(t)+FD(t+1)+FD(t+2))=150−(40+40+60)=10 units. As the projected inventory remains positive, at least three stock cover days are available.

In this example illustration 300, only a portion of the fourth day's demand may be covered by the projected inventory. The forecasted demand for the fourth day is subsequently calculated. Here, the projected inventory minus the forecasted demand for four days renders 150−(40+40+60+50) which equals −40 units. In other words, PI(t)−(FD(t)+FD(t+1)+FD(t+2)+FD(t+3))=150−(40+40+60+50)=−40 units. Thus, the projected inventory can only cover 10 units of demand on day four before the projected inventory equals zero. In other words, the projected inventory can only cover 20% (10 divided by 50) of day four's demand. Therefore, the projected stock cover days equals 3.20, as shown at 360.

Figure 4:
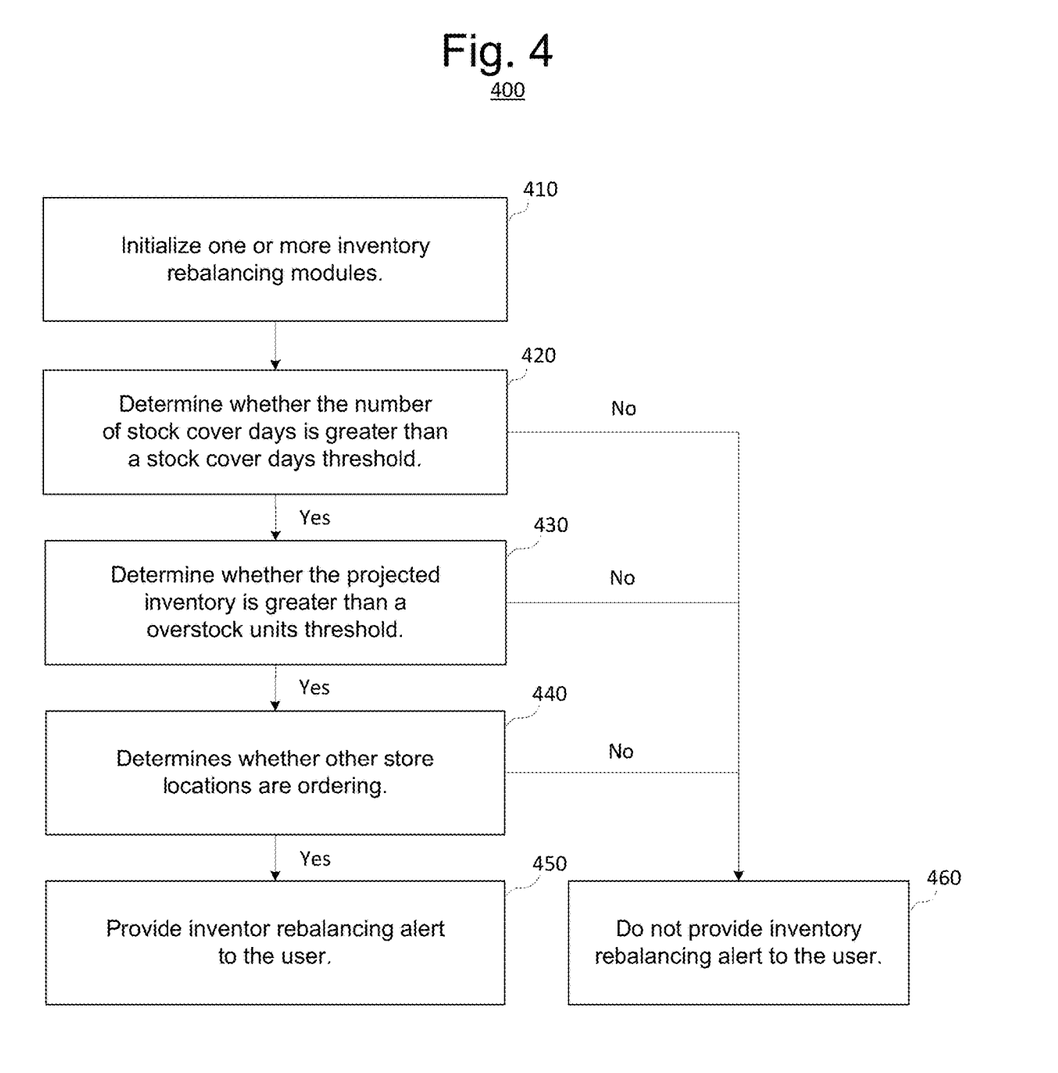
FIG. 4 is a flow diagram for triggering an overstock rebalance alert according to an example embodiment of the present invention.

FIG. 4 is a flow diagram 400 for triggering an overstock rebalance alert according to an example embodiment of the present invention.

At the outset, flow diagram 400 initializes one or more inventory rebalancing modules, at 410. Here, the inventory rebalancing modules (e.g., inventory rebalancing modules 116 of FIG. 1) may be activated to provide inventory information for particular items (e.g., by SKU), particular stores (e.g., by a store identification number), or particular time periods (e.g., days, weeks, calendar seasons, holiday seasons, etc.). In some instances, the inventory rebalancing modules may be initialized by setting one or more flags in a database (e.g., database 117 of FIG. 1).

Next, at 420, flow diagram 400 determines whether the number of stock cover days is greater than a stock cover days threshold. If the number of stock cover days is greater than the stock cover days threshold, flow diagram 400 proceeds to 430. Otherwise, if the number of stock cover days is not greater than the stock cover days threshold, flow diagram 400 proceeds to 460, and no overstock rebalancing alert is provided to the user. Alternatively, or additionally, a variety of other thresholds and/or parameters may also be used. For example, each of the following may be used and/or varied according to a retailer's preferences: overstock horizon, overstock rebalance locations, overstock rebalance ordering stores threshold, and overstock rebalance receiving horizon.

Subsequently, at 430, flow diagram 400 determines whether the projected inventory is greater than the overstock units threshold. If the projected inventory is greater than the overstock units threshold, flow diagram 400 proceeds to 440. Otherwise, if the projected inventory is not greater than the overstock units threshold, flow diagram 400 proceeds to 460, and no overstock rebalancing alert is provided to the user.

At 440, flow diagram 400 determines whether other store locations are ordering the particular products. Alternatively, flow diagram 400 may also determine whether the retailer's warehouses are ordering or being otherwise supplied with the particular products. In some instances, this condition may utilize the overstock rebalance locations parameter to determine whether other store locations are ordering, and/or which store locations to check. If other store locations are ordering, flow diagram 400 proceeds to 450, and an overstock rebalancing alert is provided to the user. Otherwise, if other store locations are not ordering, flow diagram 400 proceeds to 460, and no overstock rebalancing alert is provided to the user.

Thus, at 450, the overstock rebalance alert indicates to the user that an overstock might be mitigated by sending stock from one store to other local stores or back to the warehouse. A variety of alert types may be used. For example, the overstock rebalance alert may be included in the user interface or "dashboard" of the rebalancing application (e.g., an alert dashboard 700 of FIG. 7). When the user logs into the rebalancing application, a first screen may graphically depict a list of multiple system alerts, and the number of hits (e.g., SKU numbers and/or store identifiers). Using the overstock rebalancing alert, the user may view a count of SKU numbers and/or store identifiers which meet a predetermined criteria. The user can then "drill-in" to view additional details by using the alerted SKU numbers and/or stores identifiers to open a "workbook" or user dialog to review key performance indicators ("KPIs") and perform the desired rebalancing. In other instances, an alert may be provided to the user by text message and other communication mechanisms. This is very beneficial if other store locations of the retailer also ordering as it can reduce overall ordering into the supply chain.

Example pseudocode for inventory rebalancing is as follows:

```
{
If Rebalance Locations is 'Warehouse'
    Find the store source for the day.
        If it is a warehouse and the warehouse has an Unconstrained Receipt
        Plan at some point between the current overstock day and the
        Overstock Rebalance Receiving Horizon the 'Other Ordering
        Locations' condition is true.
    Else-if Rebalance Locations is District OR Region
        Find at least s + 1 stores, where s = Overstock Rebalance Ordering
        Stores Threshold, within the Overstock Rebalance Locations
        [District, Region] that has an Unconstrained Receipt Plan (Capped)
        at some point between the current overstock day and the Overstock
        Rebalance Receiving Horizon the 'Other Ordering Locations'
        condition is true.
    Else
        Condition is False (Receiving Locations is blank)
}
```

Rebalancing alerts may be calculated as part of a batch process. For example, rebalancing alerts may be determined for each SKU and for each store for the overstock horizon period. In the various embodiments, the user may select (e.g., using a checkbox) to automatically accept or reject the rebalancing alerts and recommendations. For example, the user may select to ignore rebalancing alerts for a period (e.g., days, weeks, etc.) if the user has determined that an inventory rebalance is not financially viable. During such periods, the user may not be notified of alerts if the user has determined to reject the rebalancing alerts.

Figure 5:
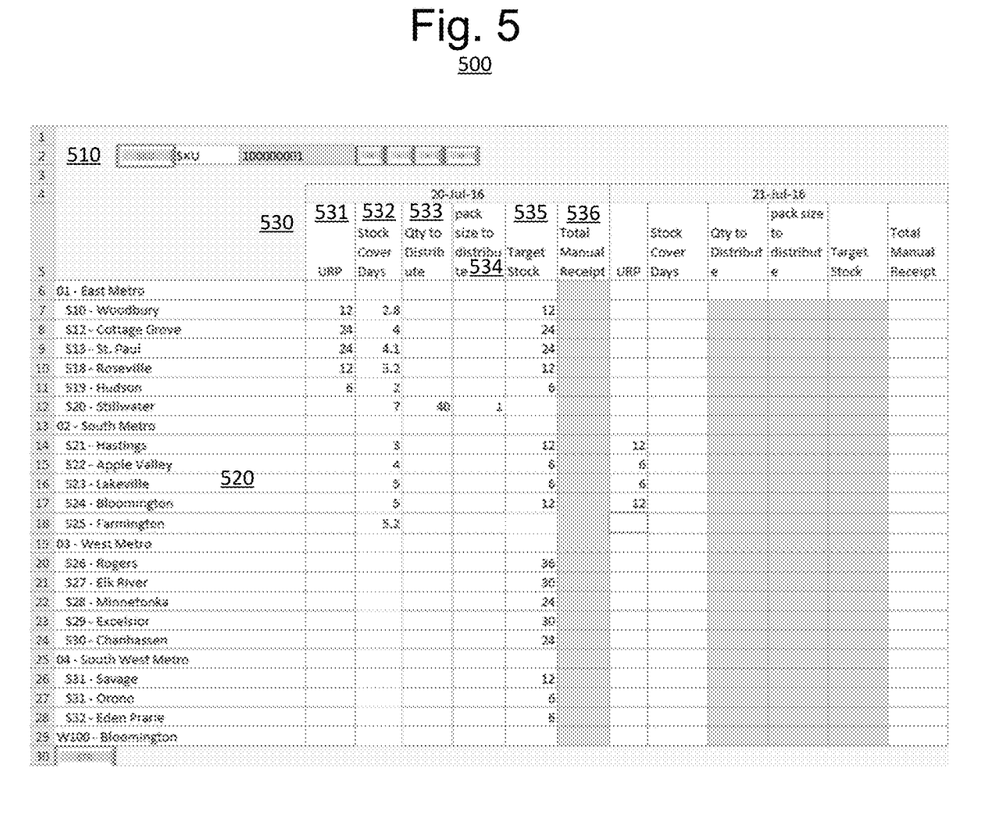
FIG. 5 represents an example user interface for monitoring inventory across a plurality of store locations in accordance with an example embodiment of the present invention.

FIG. 5 represents an example user interface 500 for monitoring inventory across a plurality of store locations in accordance with an example embodiment of the present invention.

As shown in FIG. 5, user interface 500 includes SKU selection section 510, listing of stores 520, and a variety of inventory rebalancing metrics 530 for each store. Example inventory rebalancing metrics 530 may include an unconstrained receipt plan. ("URP") 531, stock cover days 532, quantity to distribute 533, pack size to distribute 534, and target stock 535, and total manual receipt 536. In addition, inventory rebalancing metrics 530 may be provided for a particular time period (e.g., days, weeks, holiday season, etc.). Target stock 535 may include a user entered stock target that is defined in order to determine quantity to distribute 533 from a source store location to one or more other store locations. Target stock 535 equals URP 531 when the user chooses to set target stock 535 equal to URP 531 to achieve the same fill level as the URP 531 or to represent a ratio of desired inventory versus quantity to distribute 533 across the stores. The rebalancing of inventory also results in the tracking of inventory receipts at total manual receipt 536.

Within user interface 500, the user may wish to distribute a quantity of the selected SKU 510 to one or more store locations or warehouses. The user may review the information for the various store locations provided within the listing of stores 520 to determine what quantity to distribute from the source store and to which destination stores the quantity should be distributed. The destination locations (i.e., stores or warehouses) may be used to specify the target quantity against which the receiving destinations will be evaluated. In some instances, the target quantity may be used to generate a ranking or ratio for the quantity each destination location may receive. In the event that the user selects to rebalance the inventory for a particular SKU, the quantity may be automatically and proportionally distributed among the destination locations or destination time periods. The resulting distribution quantity also may be displayed in the receipt user interface of FIG. 6. Thus, the embodiments can review nearby stores or warehouse for inventory needs.

Figure 6:
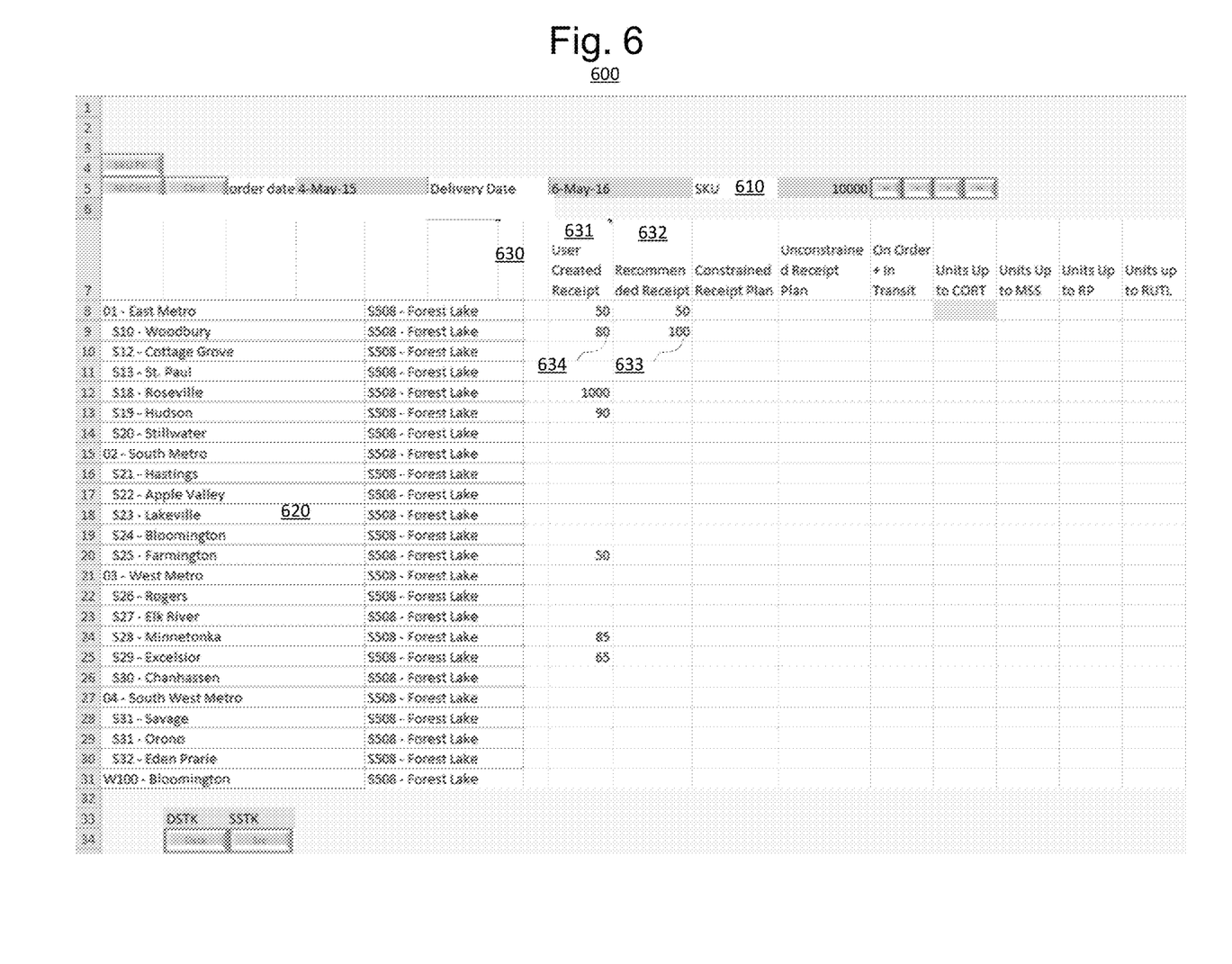
FIG. 6 represents an example receipt user interface for recommending and tracking rebalanced inventory in accordance with an example embodiment of the present invention.

FIG. 6 represents an example user interface 600 for recommending and tracking rebalanced inventory in accordance with an example embodiment of the present invention.

As shown in FIG. 6, user interface 600 includes SKU selection section 610, listing of stores 620, and a variety of inventory tracking metrics 630 for each store. Example inventory tracking metrics 630 include the "user created receipt" 631 which may be compared to the "recommended receipt" 632. Recommended receipt 632 is the output of the inventory rebalancing modules, and identifies a quantity of inventory for rebalancing. Here, the user has flexibility to determine how much or little of the overstock inventory to send. For example, inventory rebalancing modules provide recommended receipt 632 of inventory of 100 units, at 633. However, the user may override recommended receipt 632 and provide user created receipt 631 of 80 units, at 634.

The inventory rebalancing modules utilize various precision based systems to generate recommended inventory fill levels (e.g., safety stock, presentation stock, minimum sales inventory, etc.) which can be relied upon by the user to determine the target fill levels for rebalancing inventory. Within user interface 600, the user is graphically presented with source and destination locations, and their respective rebalanced quantities. In the various embodiments, the user is provided with several parameters that may include order dates, source location identifiers, SKUs, SKU packet sizes, destination location identifiers, delivery dates, and the like. Typically, the recommended rebalance calculation may require a variety of input values including an SKU, quantity to redistribute that is greater than zero, a pack size, and the like. The inventory rebalancing modules calculate recommended quantities of a particular SKU to send to destination locations.

The source location, SKU, and date from the non-zero quantity to distribute may be combined with the destination location, and delivery dates having a target stock quantity greater than zero in order to determine a distribution quantity. The date of the distribution quantity represents the order date, and the date of the target stock represents the delivery date of the distributed quantity.

Example pseudocode for calculating recommended inventory rebalancing is as follows:

```
{
For Each SKU/Location/Day with a Qty to Distribute > 0 (this is current SKU, source, order date)
    Current SKU Pack = Pack Size to Distribute_{current SKU/src/order date}
    RoundedQtytoDistrbt = Floor(Qty to Distribute, Current SKU Pack)
    Find destination/delivery day list where (Target Qty > 0 for current SKU AND date >= current order date)
    TotalTargetQty = SUM(Floor(Target Qty, Current SKU Pack)) across all destination/delivery days in the list
    IF (Total Target Qty > RoundedQtytoDistrbt)
        Loop over destination/delivery day list
            Find the first day with a URP > 0 where (URP day >= delivery day AND URP destination = destination AND URP SKU = current SKU)
            Next destination/delivery day
        Sort the destination/delivery day list according to first URP day, increasing, then by Target Qty, decreasing
        Where no URP day is found the dest/day is sorted to the bottom
        remainingQty = RoundedQtytoDistrbt
        Loop over the sorted destination/delivery day list
            RedManualReceipt_{current src/sku pack/order date/dest/delivery date} = Floor ( min(remainingQty, Target Qty_{dest/delivery day}), Current SKU Pack)
            remainingQty = remainingQty - RedManualReceipt_{current src/sku pack/orderdate/dest/delivery date}
            If remaining Qty = 0
                Break out of destination/delivery day loop
            End-if
        Next destination/delivery day
    Else
        TargetPercent = RoundedQtytoDistrbt / SUM(Target Qty across all destination/delivery days in the list)
        Loop over destination/delivery day list
            TargetReceipt_{dest/delivery date} = TargetQty_{dest/delivery date} * TargetPercent
            RoundedReceipt_{dest/delivery date} = Floor (TargetReceipt_{dest/delivery date}, Current SKU Pack)
            PercentofPack_{dest/delivery date} = (mod (TargetReceipt_{dest/delivery date}, Current SKU Pack)) / Current SKU Pack
            TotalAllotted = TotalAllotted + RoundedReceipt_{dest/delivery date}
        Next destination/delivery day
        remainingQty = RoundedQtytoDistrbt - TotalAllotted
        if remainingQty > 0
            Loop over PercentofPack in decreasing order
            PercentofPack represents the portion of a pack that is filled by the target receipt and therefore the 'cost' of rounding up to a full pack. The more that is 'filled' the lower the cost of rounding up.
                RoundedReceipt_{dest/delivery date} = RoundedReceipt_{dest/delivery date} + Current SKU Pack
                remainingQty = remainingQty - Current SKU Pack
                If remainingQty = 0
                    Break out of PercentofPack loop
                End-if
            End-if
        Loop over RoundedReceipt destination/delivery days
            RedManualReceipt_{current src/sku pack/order date/dest/delivery date} = RoundedReceipt_{dest/delivery date}
        Next destination/delivery day
    End-if
}
```

Figure 7:
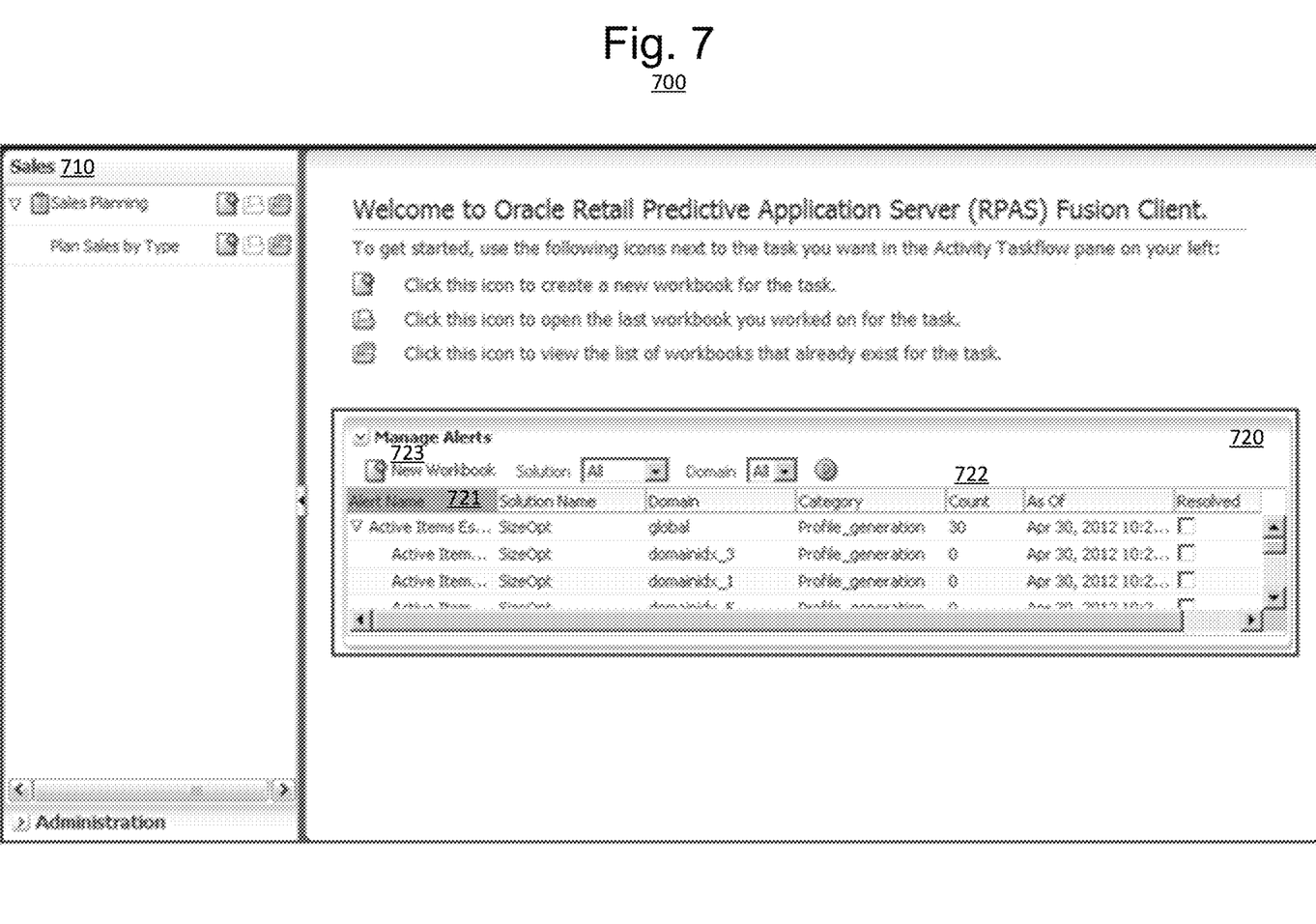
FIG. 7 represents an example alert dashboard for recommending inventory rebalancing in accordance with an example embodiment of the present invention.

FIG. 7 represents an example alert dashboard 700 for recommending inventory rebalancing in accordance with an example embodiment of the present invention. As shown in FIG. 7, alert dashboard 700 includes a navigation section 710 and an alerts section 720. Within navigation section 710, the user may navigate to various workbooks in the inventory management application. Alert dashboard 700 may be part of an AIP application, for example. The inventory management application, such as an AIP application, may include one or more workbooks, each workbook having one or more worksheets for storing and manipulating inventory data. Alerts section 720 may graphically depict a list of one or more system alerts, and the user may be provided with or linked to a count of SKU numbers and/or store identifiers which meet a predetermined criteria. For example, alerts section 720 may include a list of various alerts 721 (e.g., "Overstock Rebalance" or "Active Item"). For an overstock rebalance alert, the "count" field 722 may identify the number of SKUs, stores, and/or number of inventory days in connection with the overstock rebalance alert. In addition, the new workbook link 723 may launch one or more displays (e.g., a popup window) for the user to select a receipts workbook.

Figure 8A:
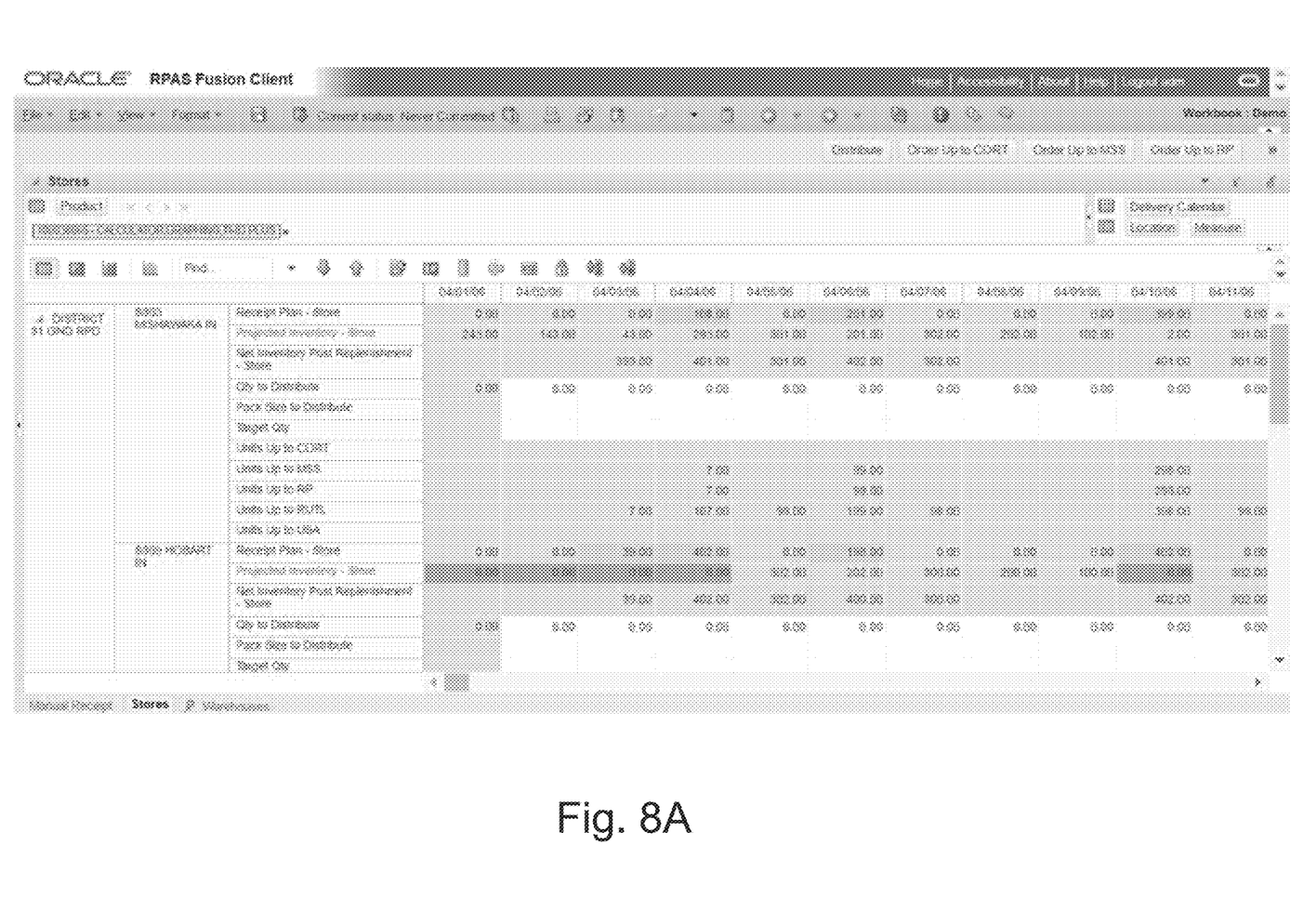
FIGS. 8A and 8B represent example views of a receipt workbook suitable for use with the example embodiments of the present invention.
Figure 8B:
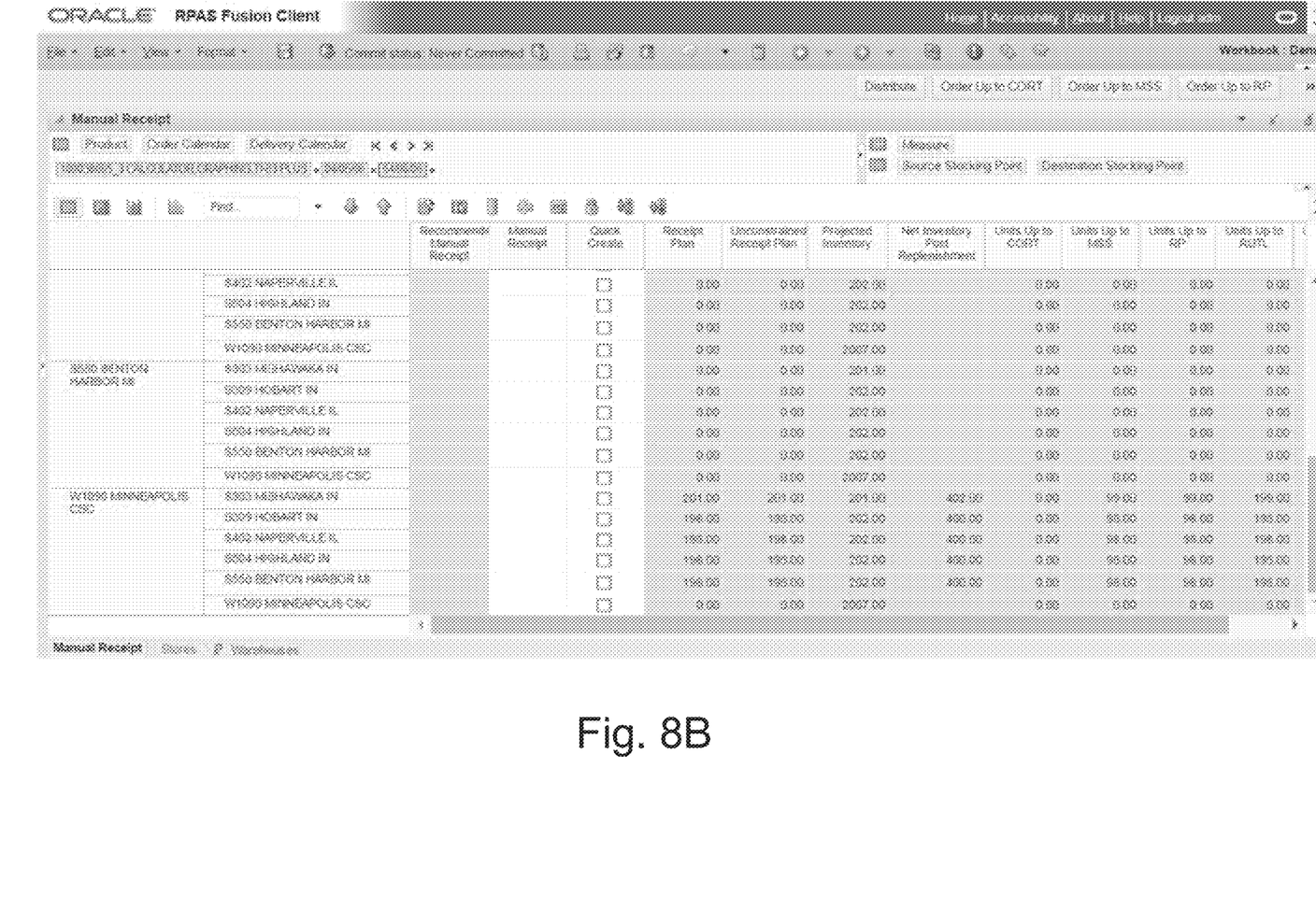

FIGS. 8A and 8B represent example views of a receipt workbook suitable for use with the example embodiments of the present invention. FIG. 8A illustrates a stores worksheet view 810 and FIG. 8B illustrates a receipt worksheet view 850. After selecting the new workbook link 723 of FIG. 7, one or more screens (e.g., a wizard) may guide the user through the selection of SKUs, stores identifiers, warehouses and/or other inventory sources, and number of inventory days. Accordingly, stores worksheet view 810 and receipt worksheet view 850 may be automatically pre-populated with SKUs, store identifiers, and number of inventory days that caused the one or more overstock rebalance alerts. The user may then select the source warehouse(s) and any additional SKUs, stores identifiers, and/or number of inventory days that the user wishes to view and/or modify.

Inventory rebalancing is done to mitigate an overstock at a store location and in so doing reduces the overall purchasing by the retailer of inventory from the supplier. Rebalancing is relatively expensive since it is following non-standard supply chain routes, and there are no economies of scale. In addition, the inventory rebalancing modules meet the greatest need rather than "fair" sharing. As a result, costs are reduced, more often than not, by sending more inventory to fewer locations.

By employing the embodiments, the user is provided with a highly accurate projection of inventory, and improved inventory rebalancing decisions may be made. The inventory rebalancing modules can anticipate and identify, with accuracy, inventory restocking problems that will crop up in the future. As a result of such advanced visibility, the retailer does not have to wait until the store is overstocked in order to mitigate the problem. In addition, potential lost sales at other stores and additional purchasing of inventory into the supply chain are avoided. The advanced visibility to inventory overstock gives the retailer more time to analyze root cause and resolve the issue in a strategically beneficial way.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed:

1. A method for rebalancing inventory to mitigate inventory overstock of a plurality of retail products at a first physical location, the method comprising:
   receiving through a communication device inventory information for the retail products indicating an amount of the retail products available at the first physical location;
   determining, using one or more processors, a number of projected stock cover days $SCD_{count}$ for each of the plurality of retail products based on a projected inventory, an amount of back orders, an amount of total substitute quantity, and an adjusted demand, wherein the number of projected stock cover days for each of the plurality of retail products is determined iteratively based on forecasted stock and forecasted demand over a number of days;
   determining, by the processors, that the number of projected stock cover days $SCD_{count}$ for at least a given one of the retail products is greater than a stock cover days threshold based on the inventory information for the given retail product;
   determining, by the processors, that the projected inventory for the given retail product is greater than an overstock units threshold based on the inventory information for the given retail product;
   in response to the number of projected stock cover days $SCD_{count}$ for the given retail product exceeding the stock cover days threshold and the projected inventory for the given retail product exceeding the overstock units threshold, determining, by the processors, whether another physical store location is ordering the given retail product;
   in response to a determination that the another physical store location is ordering, generating a recommended inventory rebalance quantity for the given retail product between the first physical location and the another physical store location;
   displaying to a user an overstock rebalancing alert comprising the recommended inventory rebalance quantity within a user interface for an inventory management system; and
   in response to the overstock rebalancing alert and user input received at the user interface, triggering, by the processors, a rebalancing of the given retail product between the first physical location and the another physical store location, wherein the user input comprises accepting or modifying the recommended inventory rebalance quantity and the rebalancing is triggered using the inventory management system.

2. The method according to claim 1, wherein,
   determining the number of projected stock cover days comprises evaluating the expression $\{PI_t-BO-TSQ_x-(DMD_x+CO_x+DAPI_x+DARcpt_x)\}$,
   where x number of days from current day t, PI equals projected inventory, BO equals back orders, TSQ denotes total substitute quantity, DMD denotes demand, CO denotes customer orders, DAPI denotes demand adjustments to projected inventory, and DARcpt denotes demand adjustments to receipts.

3. The method according to claim 1, wherein the overstock rebalancing alert is generated based on a batch process for multiple stores including the first physical location and the another physical store location.

4. The method according to claim 1, further comprising graphically identifying a movement of the given retail product between the first physical location and the another physical store location, wherein at least one of the first physical location and the another physical store location comprises a storefront and at least one of the first physical location and the another physical store location comprises a warehouse.

5. The method according to claim 1, wherein the user interface comprises a dashboard of inventory management software, wherein the dashboard is linked to one or more worksheets of the inventory management software.

6. The method according to claim 1, wherein, when the user input comprises accepting the recommended inventory rebalance quantity, the triggered rebalancing of the given retail product rebalances the recommended quantity of the given retail product to the another physical store location.

7. The method according to claim 3, further comprising:
   in response to the determination that the another physical store location is ordering, determining, based on the batch process, one or more delivery days for rebalancing the given retail product between the first physical location and the another physical store location and a quantity of the given retail product for each delivery day.

8. The method according to claim 7, wherein, when the user input comprises accepting the recommended inventory rebalance quantity, the triggered rebalancing of the given retail product rebalances the recommended quantity of the given retail product to the another physical store location based on the determined one or more delivery days and quantities for each delivery day.

9. A system for rebalancing inventory to mitigate inventory overstock of a plurality of retail products at a first physical location, the system comprising:
   the first physical location and another physical store location;

a communication device operatively connected to one or more processors; and memory storing one or more programs for execution by the one or more processors, the one or more programs including instructions for:

receiving through the communication device inventory information for the retail products indicating an amount of the retail products available at the first physical location;

determining a number of projected stock cover days $SCD_{count}$ for each of the plurality of retail products based on a projected inventory, an amount of back orders, an amount of total substitute quantity, and an adjusted demand, wherein the number of projected stock cover days for each of the plurality of retail products is determined iteratively based on forecasted stock and forecasted demand over a number of days;

determining that the number of projected stock cover days $SCD_{count}$ for at least a given one of the retail products is greater than a stock cover days threshold based on the inventory information for the given retail product;

determining that the projected inventory for the given retail product is greater than an overstock units threshold based on the inventory information for the given retail product;

in response to the number of projected stock cover days $SCD_{count}$ for the given retail product exceeding the stock cover days threshold and the projected inventory for the given retail product exceeding the overstock units threshold, determining whether the another physical store location is ordering the given retail product;

in response to a determination that the another physical store location is ordering, generating a recommended inventory rebalance quantity for the given retail product between the first physical location and the another physical store location;

displaying to a user an overstock rebalancing alert comprising the recommended inventory rebalance quantity within a user interface for an inventory management system; and in response to the overstock rebalancing alert and user input received at the user interface, triggering a rebalancing of the given retail product between the first physical location and the another physical store location, wherein the user input comprises accepting or modifying the recommended inventory rebalance quantity and the rebalancing is triggered using the inventory management system.

10. The system according to claim 6, wherein determining the number of projected stock cover days comprises evaluating the expression $\{PI_t-BO-TSQ_x-(DMD_x+CO_x+DAPI_x+DARcpt_x)\}$, where x number of days from current day t, PI equals projected inventory, BO equals back orders, TSQ denotes total substitute quantity, DMD denotes demand, CO denotes customer orders, DAPI denotes demand adjustments to projected inventory, and DARcpt denotes demand adjustments to receipts.

11. The system according to claim 9, wherein the overstock rebalancing alert is generated based on a batch process for multiple stores including the first physical location and the another physical store location.

12. The system according to claim 9, further comprising instructions for graphically identifying a movement of the given retail product between the first physical location and the another physical store location, wherein at least one of the first physical location and the another physical store location comprises a storefront and at least one of the first physical location and the another physical store location comprises a warehouse.

13. A non-transitory computer readable storage medium storing one or more programs configured to be executed by a processor, the one or more programs comprising instructions for:

receiving through a communication device inventory information for a plurality of retail products indicating an amount of the retail products available at a first physical location;

determining a number of projected stock cover days $SCD_{count}$ for each of the plurality of retail products based on a projected inventory, an amount back orders, an amount of total substitute quantity, and an adjusted demand, wherein the number of projected stock cover days for each of the plurality of retail products is determined iteratively based on forecasted stock and forecasted demand over a number of days;

determining that the number of projected stock cover days $SCD_{count}$ for the given retail product is greater than a stock cover days threshold based on the inventory information for the given retail product;

determining that the projected inventory for the given retail product is greater than an overstock units threshold based on the inventory information for the given retail product;

in response to the number of projected stock cover days $SCD_{count}$ for the given retail product exceeding the stock cover days threshold and the projected inventory for the given retail product exceeding the overstock units threshold, determining whether another physical store location is ordering the given retail product;

in response to a determination that the another physical store location is ordering, generating a recommended inventory rebalance quantity for the given retail product between the first physical location and the another physical store location;

displaying to a user an overstock rebalancing alert comprising the recommended inventory rebalance quantity within a user interface for an inventory management system; and in response to the overstock rebalancing alert and user input received at the user interface, triggering a rebalancing of the given retail product between the first physical location and the another physical store location, wherein the user input comprises accepting or modifying the recommended inventory rebalance quantity and the rebalancing is triggered using the inventory management system.

14. The non-transitory computer readable storage medium according to claim 13, wherein, determining the number of projected stock cover days comprises evaluating the expression $\{PI_t-BO-TSQ_x-(DMD_x+CO_x+DAPI_x+DARcpt_x)\}$, where x number of days from current day t, PI equals projected inventory, BO equals back orders, TSQ denotes total substitute quantity, DMD denotes demand, CO denotes customer orders, DAPI denotes demand adjustments to projected inventory, and DARcpt denotes demand adjustments to receipts.

15. The non-transitory computer readable storage medium according to claim 13, wherein the overstock rebalancing alert is generated based on a batch process for multiple stores including the first physical location and the another physical store location.

16. The non-transitory computer readable storage medium according to claim 13, further comprising instructions for graphically identifying a movement of the given retail product between the first physical location and the another physical store location, wherein at least one of the first physical location and the another physical store location comprises a storefront and at least one of the first physical location and the another physical store location comprises a warehouse.

17. The non-transitory computer readable storage medium according to claim 1, wherein the user interface comprises a dashboard of the inventory management system, wherein the dashboard is linked to one or more worksheets of the inventory management system.

18. The method according to claim 1, wherein the user input comprises a modified quantity of the given retail product for rebalancing that overrides the recommended inventory rebalance quantity, and the triggered rebalancing of the given retail product rebalances the modified quantity of the given retail product to the another physical store location.

19. The method according to claim 1, wherein the overstock rebalancing alert comprises a count field that defines a number of inventory days for the overstock rebalancing alert.

20. The method according to claim 1, wherein the rebalancing of the given retail product between the first physical location and the another physical store location satisfies at least a portion of the order for the given retail product.

* * * * *

UNITED STATES PATENT AND TRADEMARK OFFICE
CERTIFICATE OF CORRECTION

PATENT NO. : 10,713,615 B2
APPLICATION NO. : 15/419302
DATED : July 14, 2020
INVENTOR(S) : Smith et al.

It is certified that error appears in the above-identified patent and that said Letters Patent is hereby corrected as shown below:

In the Specification

Column 2, Line 64, delete "and or" and insert -- and/or --, therefor.

Column 9, Line 65, delete "$_{pack/orderdate/dest/delivery}$" and insert -- $_{pack/order\ date/dest/delivery}$ --, therefor.

In the Claims

Column 13, Line 49, Claim 10, delete "claim 6," and insert -- claim 9, --, therefor.

Column 13, Line 65, Claim 12, delete "(liven" and insert -- given --, therefor.

Column 14, Line 14, Claim 13, after "amount" insert -- of --.

Column 15, Line 11, Claim 17, delete "claim 1" and insert -- claim 13 --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*